(12) United States Patent
Hunt et al.

(10) Patent No.: US 10,834,798 B1
(45) Date of Patent: Nov. 10, 2020

(54) SYSTEM AND METHOD FOR AUTOMATICALLY ADJUSTING AN ILLUMINATION PATTERN FOR A HARVESTING IMPLEMENT

(71) Applicant: CNH Industrial America LLC, New Holland, PA (US)

(72) Inventors: Cory Douglas Hunt, Millersville, PA (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/523,148

(22) Filed: Jul. 26, 2019

(51) Int. Cl.
*A01D 41/12* (2006.01)
*B60Q 1/08* (2006.01)
*H05B 47/155* (2020.01)
*A01D 75/00* (2006.01)

(52) U.S. Cl.
CPC ........... *H05B 47/155* (2020.01); *A01D 41/12* (2013.01); *A01D 75/00* (2013.01)

(58) Field of Classification Search
CPC ...... A01D 41/14; A01D 41/141; A01D 41/00; A01D 41/12; A01D 75/00; B60Q 1/08; B60Q 1/085; B60Q 2300/45; B60Q 1/24; B60Q 1/245; B60Q 1/0483; H05B 47/155; H05B 47/10; H05B 47/105
See application file for complete search history.

(56) References Cited

U.S. PATENT DOCUMENTS

| 5,442,527 | A | 8/1995 | Wichelt | |
| 6,239,696 | B1* | 5/2001 | Berger | B60Q 1/26 340/463 |
| 6,661,338 | B2* | 12/2003 | Holthaus | B60Q 9/001 200/302.3 |
| 9,527,493 | B2 | 12/2016 | Von Mezynski | |
| 2010/0245542 | A1* | 9/2010 | Kim | G01B 11/00 348/46 |

(Continued)

FOREIGN PATENT DOCUMENTS

| CN | 1698412 | 11/2005 |
| EP | 2158799 | 3/2010 |

(Continued)

*Primary Examiner* — Thai Pham
(74) *Attorney, Agent, or Firm* — Peter Zacharias; Patrick Sheldrake (57) ABSTRACT

An illumination system for a harvesting implement including two or more lighting devices, each lighting device coupled to the harvesting implement and configured to illuminate an area of crop engagement, a path of the harvesting implement, or both. The illumination system additionally includes a controller coupled to the harvesting implement and communicatively coupled to the lighting devices. The controller is configured to control an operation of the illumination system to provide a first pre-set illumination pattern based on a first operating state of the harvesting implement. The controller is further configured to receive an input indicative of a change in the operating state of the harvesting implement. Further, the controller is configured to, in response to receipt of the input, control the operation of the illumination array to provide a second pre-set illumination pattern based on the change in the operating state.

20 Claims, 6 Drawing Sheets

(56) References Cited

U.S. PATENT DOCUMENTS

2018/0271019 A1\* 9/2018 Noll ................. A01D 34/14

FOREIGN PATENT DOCUMENTS

| EP | 2746105 | 6/2014 | |
| EP | 3130211 | 2/2017 | |
| KR | 2014/0128786 | 11/2014 | |
| WO | WO 2019/036674 | 2/2019 | |
| WO | WO-2019036674 A1 \* | 2/2019 | ............ B60Q 1/085 |

\* cited by examiner

SYSTEM AND METHOD FOR AUTOMATICALLY ADJUSTING AN ILLUMINATION PATTERN FOR A HARVESTING IMPLEMENT

FIELD

The present disclosure generally relates to agricultural harvesters and, more particularly, to systems and methods for automatically adjusting an illumination pattern of lighting devices of a harvesting implement.

BACKGROUND

A harvester is an agricultural machine used to harvest and process crops. For instance, a combine harvester may be used to harvest grain crops, such as wheat, oats, rye, barley, corn, soybeans, and flax, or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field. The harvester also includes a crop processing system, which performs various processing operations (e.g., threshing, separating, etc.) on the harvested crop received from the harvesting implement. Furthermore, the harvester includes a crop tank, which receives and stores the harvested crop after processing.

Many crops, such as corn and soybeans, are planted in rows. Further, the harvester is generally operated in passes through the field that may or may not be aligned with the rows of the crop. As such, when the harvester is moved across the field, it is desirable that the direction of travel of the harvester be generally aligned with the orientation of the previous pass, which may be aligned with the crop rows, so as to maximize harvesting efficiency. However, it is often necessary to operate the harvester in low lighting conditions. As such, it may be difficult to orient the harvester and/or header relative to the previous passes of the harvester and/or crop rows or see obstacles or impediments in the path of the header. Low lighting conditions may also make it difficult to monitor the harvesting operation. for instance the operation of the header. In this regard, some harvesters include exterior work lights for illuminating the areas on and/or around the vehicle or header for nighttime operation and/or for operation during low visibility conditions.

However, such configurations may have drawbacks. For example, work lights provided on the harvester may not sufficiently illuminate the header and/or the path of the header during the harvesting operation. Additionally, an operator of the harvester may be required to individually select which working lights receive power and are thus illuminated during a particular task.

Accordingly, an improved illumination system and method for use during the operation of a harvesting implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an illumination system for the operation of an agricultural harvester. The illumination system includes a harvesting implement configured for coupling to an agricultural harvester. The illumination system further includes an illumination array including two or more lighting devices. Moreover, each lighting device is coupled to the harvesting implement and configured to illuminate an area of crop engagement, a path of the harvesting implement, or both. The illumination system additionally includes a controller coupled to the harvesting implement and communicatively coupled to each lighting device of the plurality of lighting devices. The controller is configured to control an operation of the illumination array such that the lighting devices provide a first pre-set illumination pattern for one or more of the lighting device based on a first operating state of the harvesting implement. The controller is further configured to receive an input indicative of a change in the operating state of the harvesting implement from the first operating state to a second operating state. Further, the controller is configured to, in response to receipt of the input, control the operation of the illumination array such that the lighting devices provide a second pre-set illumination pattern for the at least one lighting device of the plurality of lighting devices based on the change in the operating state of the harvesting implement. Moreover, first pre-set illumination pattern differs from the second pre-set illumination pattern.

In another aspect, the present subject matter is directed to a method for automatically adjusting an illumination pattern for a harvesting implement associated with an agricultural harvester. The method includes, controlling, with a computing device coupled to the harvesting implement, an operation of an illumination array including two or more lighting devices coupled to the harvesting implement. The illumination array is controlled such that the lighting devices provide a first pre-set illumination pattern using one or more of the lighting device. Additionally, the first pre-set illumination pattern is associated with a first operating state of the harvesting implement. The method further includes receiving, with the computing device, an input indicative of a change in the operating state of the harvesting implement from the first operating state to a second operating state. The method additionally includes, in response to receipt of the input, controlling, with the computing device, the operation of the illumination array such that the lighting devices provide a second pre-set illumination pattern using one or more of the lighting devices based on the change in the operating state of the harvesting implement. Furthermore, the first pre-set illumination pattern differs from the second pre-set illumination pattern.

In a further aspect, the present subject matter is directed to a harvesting system. The harvesting system includes a harvester configured to move across afield. The harvesting system further includes a harvester controller coupled to the harvester and configured to control an operation of the harvester. Additionally, the harvesting system includes a harvesting implement coupled to the agricultural harvester. The harvesting system further includes an illumination system for the operation of the harvesting implement. The illumination system includes an illumination array including two or more lighting devices. Moreover, each lighting device is coupled to the harvesting implement and configured to illuminate an area of crop engagement, a path of the harvesting implement, or both. The illumination system additionally includes a controller coupled to the harvesting implement and communicatively coupled to each lighting device of the plurality of lighting devices. The controller is configured to control an operation of the illumination array such that the lighting devices provide a first pre-set illumination pattern using one or more of the lighting device based on a first operating state of the harvesting implement. The controller is further configured to receive an input indicative of a change in the operating state of the harvesting implement from the first operating state to a second operating state. Further, the controller is configured to, in response to receipt of the input, control the operation of the illumination array such that the lighting devices provide a second pre-set illumination pattern using the at least one lighting device of the plurality of lighting devices based on the change in the operating state of the harvesting implement. Moreover, the first pre-set illumination pattern differs from the second pre-set illumination pattern.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for operating an illumination system for an agricultural harvester. Specifically, in several embodiments, a controller is coupled to a harvesting implement (e.g., a header) associated with the agricultural harvester and configured to operate the header based on the operating state of the header. Furthermore, the controller is configured to control an operation of an illumination array of the illumination system based on the operating state of the header. For instance, the controller may selectively supply power to one or more lighting devices, each of which is coupled to the header, of the illumination array to illuminate an area of crop engagement, a path of the header, or both. For example, the controller may supply power to the lighting device(s) to provide a first pre-set illumination pattern based on a first operating state (e.g., a harvesting state). Further, the controller may supply power to the lighting device(s) to provide a second pre-set illumination pattern based on a second operating state (e.g., a transportation state or a turning state). The controller may receive inputs indicative of the operating state of the header or a change in the operating state of the header. For example, the controller may receive the input from a harvester controller coupled to the agricultural harvester.

Such an illumination system may allow for better lighting of the header and the path of the header as compared to an illumination system where the lighting devices are coupled to the agricultural harvester. Furthermore, by controlling the operation of the working lights from a controller coupled to the header, the number of communicative links between the harvester and the header may be reduced. For instance, one wired connection may be sufficient to communicate the desired operating state of the header from the harvester controller. Furthermore, the illumination system of the present disclosure may allow for automatic adjustment of the illumination pattern of the illumination array without the need for additional input from the operator of the harvester. For instance, instead of individually selecting which of the lighting devices should receive power, the operator may provide an input corresponding to an operating state, which is subsequently communicated to the controller coupled to the header. Thereafter, the controller may automatically provide power to the lighting devices to provide a pre-set illumination pattern corresponding to the operating state. For instance, the operator may input directions to raise the header and start turning the harvester at the end of the row of the field to start harvesting the next row. In response to receiving an input indicating such a turning state, the controller may provide power to lighting devices oriented to illuminate the path of the header toward the side of the turning operation.

Figure 1:
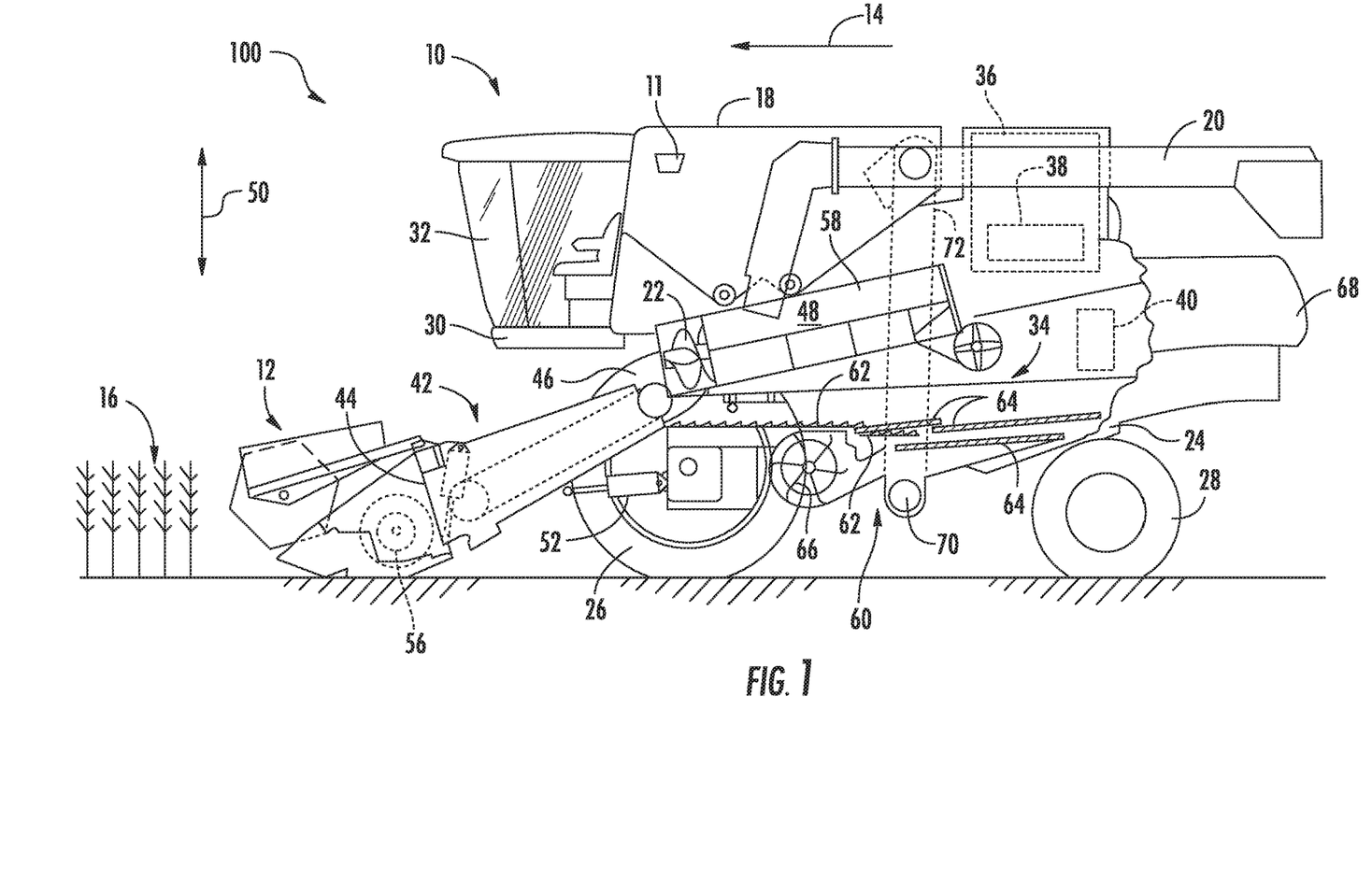
FIG. 1 illustrates a side view of one embodiment of an harvesting system in accordance with aspects of the present subject matter, particularly illustrating a partial sectional side view of the agricultural harvester.
Figure 2:
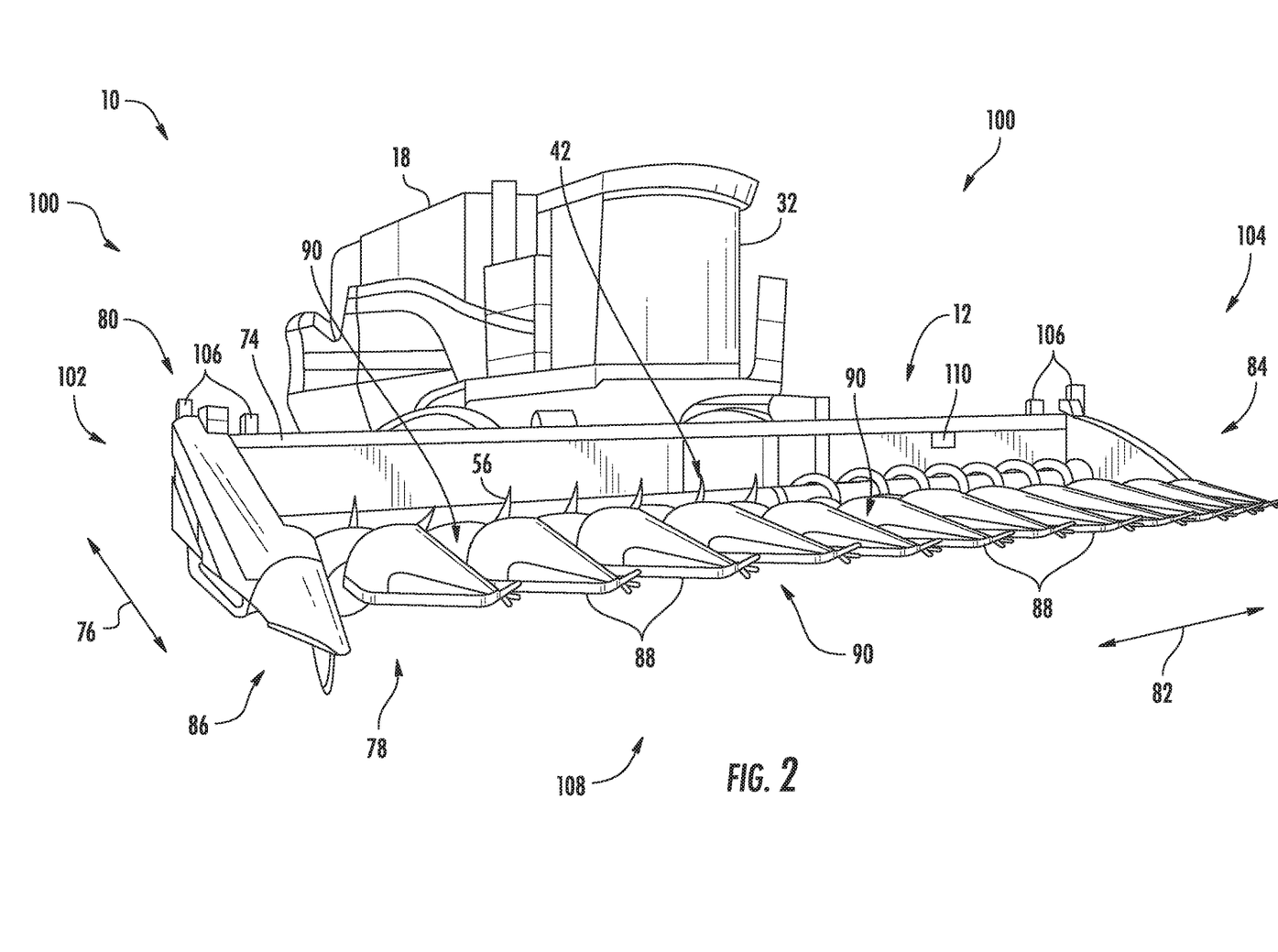
FIG. 2 illustrates another view of the harvesting system of FIG. 1 in accordance with aspects of the present subject matter, particularly illustrating a perspective view of the agricultural harvester and a harvesting implement.

Referring now to the drawings. FIGS. 1 and 2 illustrate differing views of one embodiment of a harvesting system 100 including an agricultural harvester 10 in accordance with aspects of the present subject matter. Specifically, FIG. 1 illustrates a partial sectional side view of the agricultural harvester 10. Additionally, FIG. 2 illustrates a perspective view of the harvester 10, particularly illustrating a harvesting implement (e.g., a header 12) of the harvesting system 100.

In general, the harvester 10 may be configured to move across a field in a forward direction of travel (e.g., as indicated by arrow 14) to harvest a standing crop 16. While traversing the field, the harvester 10 may be configured to process the harvested crop and store the harvested crop within a crop tank 18 of the harvester 10. Furthermore, the harvested crop may be unloaded from the crop tank 18 for receipt by the crop receiving vehicle (not shown) via a crop discharge tube 20 of the harvester 10.

As shown in FIG. 1, in one embodiment, the harvester 10 may be configured as an axial-flow type combine, wherein the harvested crop is threshed and separated while it is advanced by and along a longitudinally arranged rotor 22. However, it should be appreciated that, in alternative embodiments, the harvester 10 may have any other suitable harvester configuration.

The harvester 10 may include a chassis or main frame 24 configured to support and/or couple to various components of the harvester 10. For example, in several embodiments, the harvester 10 may include a pair of driven, ground-engaging front wheels 26 and a pair of steerable rear wheels 28 that are coupled to the frame 24. As such, the wheels 26, 28 may be configured to support the harvester 10 relative to the ground and move the harvester 10 in the forward direction of travel 14. Furthermore, the harvester 10 may include an operators platform 30 having an operator's cab 32, a crop processing system 34, the crop tank 18, and the crop discharge tube 20 that are supported by the frame 24. As will be described below, the crop processing system 34 may be configured to perform various processing operations on the harvested crop as the crop processing system 34 operates to transfer the harvested crop between header 12 of the harvester 10 and the crop tank 18. Furthermore, the harvester 10 may include an engine 36 and a transmission 38 mounted on the frame 24. The transmission 38 may be operably coupled to the engine 36 and may provide variably adjusted gear ratios for transferring engine power to the wheels 26 via a drive axle assembly (or via axles if multiple drive axles are employed). Additionally, the harvester 10 may include a steering actuator 40 configured to adjust the orientation of the steerable wheels 28 relative to the frame 24. For example, the steering actuator 40 may correspond to an electric motor, a linear actuator, a hydraulic cylinder, a pneumatic cylinder, or any other suitable actuator coupled to suitable mechanical assembly, such as a rack and pinion or a worm gear assembly.

Moreover, as shown in FIG. 1, the header 12 and an associated feeder 42 of the crop processing system 34 may extend forward of the frame 24 and may be pivotally secured thereto for generally vertical movement. In general, the feeder 42 may be configured to serve as support structure for the header 12. As shown in FIG. 1, the feeder 42 may extend between a front end 44 coupled to the header 12 and a rear end 46 positioned adjacent to a threshing and separating assembly 48 of the crop processing system 34. As is generally understood, the rear end 46 of the feeder 42 may be pivotally coupled to a portion of the harvester 10 to allow the front end 44 of the feeder 42 and, thus, the header 12 to be moved upward and downward along a vertical direction (e.g., as indicated by arrow 50) relative to the ground to set the desired harvesting or cutting height for the header 12. For example, as shown, in one embodiment, the harvester 10 may include a header actuator 52 configured to adjust the height of the header 12 relative to the ground. As such, the header actuator 52 may correspond to a fluid-driven actuator, such as a hydraulic or pneumatic cylinder, an electric linear actuator, or any other type of suitable actuator.

As the harvester 10 is propelled forwardly over the field with the standing crop 16, the crop material is severed from the stubble by a plurality of snapping rolls (not shown) and associated stripping plates (not shown) at the front of the header 12 and delivered by a header auger 56 to the front end 44 of the feeder 42, which supplies the harvested crop to the threshing and separating assembly 48. As is generally understood, the threshing and separating assembly 48 may include a cylindrical chamber 58 in which the rotor 22 is rotated to thresh and separate the harvested crop received therein. That is, the harvested crop is rubbed and beaten between the rotor 22 and the inner surfaces of the chamber 58, whereby the grain, seed, or the like, is loosened and separated from the straw.

The harvested crop 16 that has been separated by the threshing and separating assembly 48 may fall onto a crop cleaning assembly 60 of the crop processing system 34. In general, the crop cleaning assembly 60 may include a series of pans 62 and associated sieves 64. As is generally understood, the separated harvested crop 16 may be spread out via oscillation of the pans 62 and/or sieves 64 and may eventually fall through apertures defined in the sieves 64. Additionally, a cleaning fan 66 may be positioned adjacent to one or more of the sieves 64 to provide an air flow through the sieves 64 that remove chaff and other impurities from the harvested crop 16. For instance, the fan 66 may blow the impurities off of the harvested crop 16 for discharge from the harvester 10 through the outlet of a straw hood 68 positioned at the back end of the harvester 10. The cleaned harvested crop 16 passing through the sieves 64 may then fall into a trough of an auger 70, which may be configured to transfer the harvested crop 16 to an elevator 72 for delivery to the crop tank 18.

As shown in FIG. 1, the harvesting system 100 may include a harvester controller 11 coupled to the harvester 10, such as coupled to the frame 24. The harvester controller 11 may be configured to be communicatively coupled to and/or control various other components of the harvester 10. For instance, the harvester controller 11 may be configured to control various components of the crop processing system 34 such as one or more of the steering actuator 40, the threshing and separating assembly 48, the rotor 22, the crop cleaning assembly 60, the pans 62, the sieves 64, fan 66, the auger 70, or the elevator 72, Referring now to FIG. 2, the harvesting system 100 may include the harvesting implement (e.g., the header 12) coupled to the harvester 10. Moreover, the header 12 may include a header frame 74. In general, the frame 74 may extend along a longitudinal direction 76 between a forward end 78 and an aft end 80. The frame 74 may also extend along a lateral direction 82 between a first side 84 and a second side 86. In this respect the frame 74 may be configured to support or couple to a plurality of components of the header 12. For example, a plurality of cones or row dividers 88 and the header auger 56 may be supported by the header frame 74. Additionally, the snapping rolls (not shown) and associated stripping plates (not shown) may also be supported on and coupled to the frame 74.

In several embodiments, as shown in FIG. 2, the header 12 may be configured as a corn header. In such embodiments, the plurality of row dividers 88 may extend forward from the header frame 74 along the longitudinal direction 76. Moreover, the row dividers 88 may be spaced apart along the lateral direction 82 of the header frame 74, with each adjacent pair of row dividers 88 defining an associated stalkway or recess 90 therebetween. As the harvester 10 is moved across the field, the row dividers 88 separate the stalks of the crop such that the separated stalks are guided into the stalkways 90. Thereafter, as is generally understood, the snapping rolls (not shown) pull the stalks downwardly onto the associated stripping plates (not shown) such that the ears of the standing crop 16 are snapped from the associated stalks upon contact with the stripping plates. The auger 56 may then convey the harvested ears to the feeder 42 for subsequent processing by the crop processing system 34 (FIG. 1). However, it should be appreciated that, in alternative embodiments, the header 12 may be configured as any other suitable type of harvesting implement.

As shown in FIG. 2, the harvesting system 100 may include an illumination system 102 provided in operative association with the harvesting implement (e.g., the header 12). The illumination system 102 includes an illumination array 104 including a plurality of lighting devices 106 coupled to the header 12 and configured to illuminate one or more exterior portions or surrounding areas of the header 12. For instance, one or more of the lighting devices 106 may be configured to illuminate at least one of an area of crop engagement 108 or a path of the header 12. Moreover, the area of crop engagement 108 may be defined as the area between the first side 84 and the second side 86 of the header 12. The path of the header 12 may be defined to include the path in front of the header 12 in the direction of travel 14 (see, e.g. FIG. 1) or an area of the field that will be in front of the header 12 after a turning operation. In one embodiment, each of the lighting devices 106 may be coupled to the header frame 74, with the illumination array 104 including any number of individual lighting devices 106 (e.g., an array of 2-8 lighting devices 106).

Additionally, as illustrated in FIG. 2, the illumination system 102 may include a controller 110 coupled to the harvesting implement. For example, the controller 110 may be coupled to the header frame 74 of the header 12. However, it should be appreciated the controller 110 may be coupled to any other suitable component of the header 12. As explained in more detail in reference to FIG. 4 below, the controller 110 may be communicatively coupled to each lighting device 106 of the illumination array 104.

It should be further be appreciated that the configurations of the harvester 10 and the header 12 described above and shown in FIGS. 1 and 2 are provided only to place the present subject matter in an exemplary field of use. Thus, it should be appreciated that the present subject matter may be readily adaptable to any manner of harvester and/or header configuration.

Figure 3:
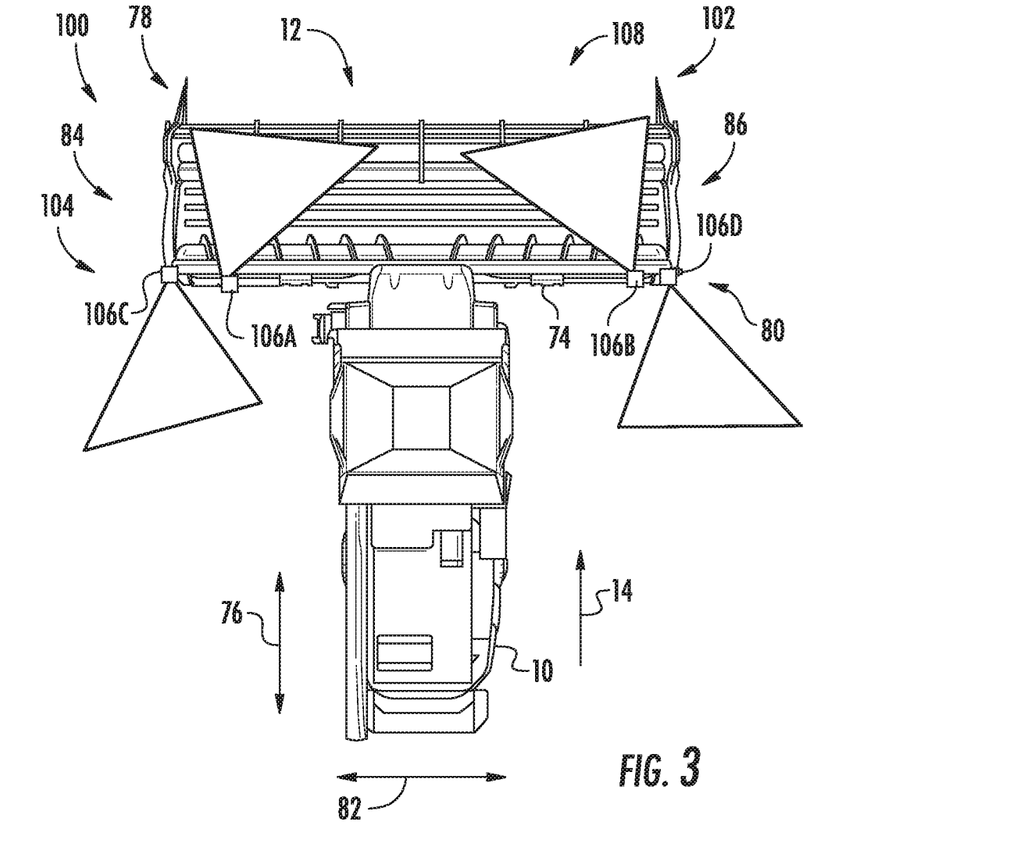
FIG. 3 illustrates a top view of the harvesting system of FIGS. 1 and 2 in accordance with aspects of the present subject matter, particularly illustrating an illumination system of the harvesting system.

Referring now to FIG. 3. a top view of the harvesting system 100 is illustrated in accordance with aspects of the present subject matter. Particularly, FIG. 3 illustrates one embodiment of the illumination system 102 including an illumination array 104 with four lighting devices 106. However, it should be appreciated that the embodiment of FIG. 3 is provided for illustrative purposes, and the illumination array 104 may include more or less lighting devices 106 each configured to illuminate the area of crop engagement 108, the path of the header 12, or both. For example, the illumination array may include a first lighting device 106A, a second lighting device 106B, a third lighting device 106C, and a fourth lighting device 106D.

In the illustrated embodiment, the first and second lighting devices 106A, 106B may each be coupled to the header frame 74 and oriented to illuminate the area of crop engagement 108. In one embodiment, as shown, the first lighting device 106A may generally be coupled to the header frame 74 toward the first side 84 and oriented in the lateral direction 82 toward the second side 86 and the longitudinal direction 76 toward the front end 78 of the header 12 such that the first lighting device 106A illuminates the area of crop engagement 108. Additionally or alternatively, the second lighting device 106B may generally be coupled to the header frame 74 toward the second side 86 and oriented in the lateral direction 82 toward the first side 84 and the longitudinal direction 76 toward the front end 78 of the header 12 such that the second lighting device 106B illuminates the area of crop engagement 108. It should also be appreciated that the first and/or second lighting devices 106A, 106B may be oriented generally downward in order to illuminate the area of crop engagement 108. In certain embodiments, the first and second lighting devices 106A, 106B may be oriented at a shallow enough downward angle such that the first and second lighting devices 106A, 106B further illuminate the path of the header 12 in the direction of travel 14 in front of the header 12.

As further illustrated in FIG. 3, the third and fourth lighting devices 106C, 106D may each be coupled to the header frame 74 and oriented to illuminate the path of the header 12 at the sides 84, 86 of the header 12. For example, the third lighting device 106C may be coupled to the first side 84 of the header frame 74 and oriented to illuminate the path of the header at the first side 84 of the header frame 74. Further, the third lighting device 106C may be oriented generally in the longitudinal direction 76 toward the aft end 80 of the header 12 such that the third lighting device 106C illuminates a path of the header 12 during a turning operation that includes a reversing step (e.g., a three-point turn). In another configuration, the third lighting device 106C may also be oriented at least partially in the lateral direction 82 toward the first side 84 of the header 12 such that the third lighting device 106C illuminates the path of the header 12 after the turning operation has been completed. In an additional or alternative embodiment, the third lighting device 106C may be oriented in both the longitudinal direction 76 toward the front end 78 of the header 12 and the lateral direction 82 toward the first side 84 of the header 12 such that the third lighting device 106C illuminates the path of the header 12 toward the first side 84 in the direction of travel 14. However, it should be appreciated that the third lighting device 106C may be oriented in any direction or combination of directions such that the third lighting device 106C illuminates at least a portion of the path of the header 12 before, after, or during a turning operation toward the first side 84 of the header 12.

Further, as shown, the fourth lighting device 106D may be coupled to the second side 86 of the header frame 74 and oriented to illuminate the path of the header at the second side 86 of the header frame 74. For example, the fourth lighting device 106D may be oriented generally in the longitudinal direction 76 toward the aft end 80 of the header 12 such that the fourth lighting device 106D illuminates a path of the header 12 during a turning operation that includes a reversing step (e.g., a three-point turn). In another configuration, the fourth lighting device 106D may also be oriented at least partially in the lateral direction 82 toward the second side 86 of the header 12 such that the fourth lighting device 106D illuminates the path of the header 12 after the turning operation has been completed. In an additional or alternative embodiment, the fourth lighting device 106D may be oriented in both the longitudinal direction 76 toward the front end 78 of the header 12 and the lateral direction 82 toward the second side 86 of the header 12 such that the fourth lighting device 106D illuminates the path of the header 12 toward the second side 86 in the direction of travel 14. However, it should be appreciated that the fourth lighting device 106D may be oriented in any direction or combination of directions such that the fourth lighting device 106D illuminates at least a portion of the path of the header 12 before, after, or during a turning operation toward the second side 86 of the header 12.

In additional or alternative embodiment, the illumination array 104 may include additional lighting devices 106 (e.g., fifth and sixth lighting devices 106) coupled to the header 12 and configured to illuminate the path of the header 12. For example, additional lighting devices 106 may be configured and/or oriented to illuminate one or more of an area in front of the area of crop engagement 108, the path of the header 12 toward the first side 84 of the header 12, or the path of the header 12 toward the second side 86 of the header 12.

Figure 4:
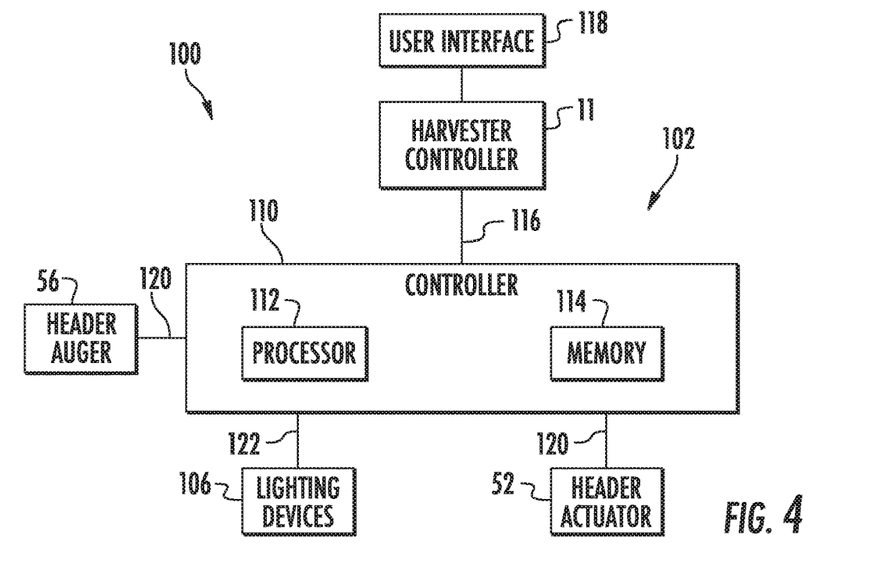
FIG. 4 schematically illustrates one embodiment of the harvesting system in accordance to aspects of the present subject matter, particularly illustrating the illumination system.

Referring now to FIG. 4, one embodiment of the harvesting system 100 is illustrated schematically in accordance with aspects of the present subject matter. Particularly, FIG. 4 illustrates the harvesting system 100 including the illumination system 102. In general, the harvesting system 100 and illumination system 102 will be described herein with reference to the header 12 and the lighting devices 106 described above with reference to FIGS. 1 through 3. However, it should be appreciated that the disclosed harvesting system 100 and illumination system 102 may generally be utilized with a header 12 and/or harvester 10 having any other suitable configuration and/or with lights or lighting devices having any other suitable lighting arrangement.

In several embodiments, the harvesting system 100 and illumination system 102 may include the controller 110 and various other components configured to be communicatively coupled to and/or controlled by the controller 110, such as one or more lighting devices 106 (e.g., first, second, third, and/or fourth lighting devices 106A, 106B, 106C, 106D) and/or one or more of the components provided in operative association with the header 12, such as the header auger 56 and/or the header actuator 52. For instance, during a harvesting state, the controller 110 may be configured to adjust the height of the header 12 to a lowered position via control of the header actuator 52 and/or to actuate the header auger 56. As a further example, in a transportation state, the controller 110 may be configured to adjust the height of the header 12 to a raised position via control of the header actuator 52 and/or to deactivate the header auger 56. Furthermore, the controller 110 may be communicatively coupled to each of the lighting devices 106 and configured to control the operation of the illumination array 104 (see FIGS. 2 and 3). For instance, the controller 110 may be configured to provide power to one or more of the lighting devices 106 (e.g., first, second, third, and/or fourth lighting devices 106A, 106B, 106C, 106D) based on the operating state of the of the header 12.

In general, the controller 110 may correspond to any suitable processor-based device(s), such as a computing device or any combination of computing devices. Thus, as shown in FIG. 4, the controller 110 may generally include one or more processor(s) 112 and associated memory devices 114 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 114 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 114 may generally be configured to store information accessible to the processor(s) 112, including data that can be retrieved, manipulated, created and/or stored by the processor(s) 112 and instructions that can be executed by the processor(s) 112.

In several embodiments, the data may be stored in one or more databases. For example, the memory 114 may include a light settings database for storing one or more light settings for each of the various different operating states that may be defined for the header 12. For instance, as indicated above, in one embodiment, one or more pre-set illumination patterns may be stored with the database that are associated with different operating states for the illumination array 104 (e.g., a harvesting state, transportation state, and/or turning state). Furthermore, the controller 110 may control the operation of the illumination array 104 by providing or not providing power to one or more of the lighting devices 106. For instance, the controller 110 may transmit a control signal from the controller 110 via one or more communicative link(s) 122 to power or not power one or more of the lighting devices 106. For example, the controller 110 may be configured to control an operation of the illumination array 104 such that one or more of the lighting devices 106 provide a first pre-set illumination pattern based on a first operating state of the header 12.

Furthermore, the controller 110 may be configured to automatically adjust the illumination pattern based on the operating state and/or a change in the operating state of the header 12. For instance, the controller 110 may be configured to receive an input indicative of the operating state of the header 12 from the harvester controller 11. It should be appreciated that the harvester controller 11 may be configured the same or similar to the controller 110. For instance, the harvester controller 11 may include one or more processor(s) and associated memory devices as described generally in reference to the controller 110. Furthermore, the harvester controller 11 may determine the operating state of the header 12 based on operator inputs received from one or more operator-controlled input devices of a user interface 118 located within the operator's cab 32 of the harvester 10. Moreover, as shown in FIG. 4, one or more communicative links 116 may be provided between the harvester controller 11 and the controller 110 to allow control signals from the harvester controller 11 to be transmitted to the controller 110. As such, the controller 110 may be configured to receive an input indicative of a change in the operating state of the header 12 from the first operating state to a second operating state. For instance, the controller 110 may receive the input indicative of the change in the operating state from the harvester controller 11 via the communicative link(s) 116.

Referring still to the embodiment of the harvesting system 100 and illumination system 102 of FIG. 4, the controller 110 may be configured to control an operative condition of the header 12 based on the input indicative of the operating state or the change in the operating state of the header 12. In several embodiments, the controller 110 may be configured to control the operation of one or more of the components provided in operative association with the header 12. For instance, in response to receiving an input indicating the header 12 is in a transportation or turning operating state, the controller 110 may be configured to control the operative condition of the header 12 such that the height of the header 12 is adjusted to a raised position via control of the header actuator 52 and/or to deactivate the header auger 56. As another example, in response to receiving an input indicating the header is in a harvesting state, the controller 110 may be configured to control the operative condition of the header 12 such that the height of the header 12 is adjusted to a lowered position via control of the header actuator 52 and/or to actuate the header auger 56. Moreover, as shown in FIG. 4, one or more communicative links 120 may be provided between the controller 110 and the one or more of the components provided in operative association with the header 12 to allow control signals from the controller 110 to be transmitted to the header components (e.g., the header auger 56 and/or the header actuator 52).

In response to receiving the input indicative of the change in the operating state of the header 12, the controller 110 may be configured to control the operation of the illumination array 104 such that the lighting devices 106 provide a second pre-set illumination pattern using one or more of the lighting devices 106 (e.g., first, second, third, and/or fourth lighting devices 106A, 106B, 106C, 106D) based on the change in the operating state of the header 12. Furthermore, it should be appreciated that the first pre-set illumination pattern may be different than the second pre-set illumination pattern.

Figure 5:
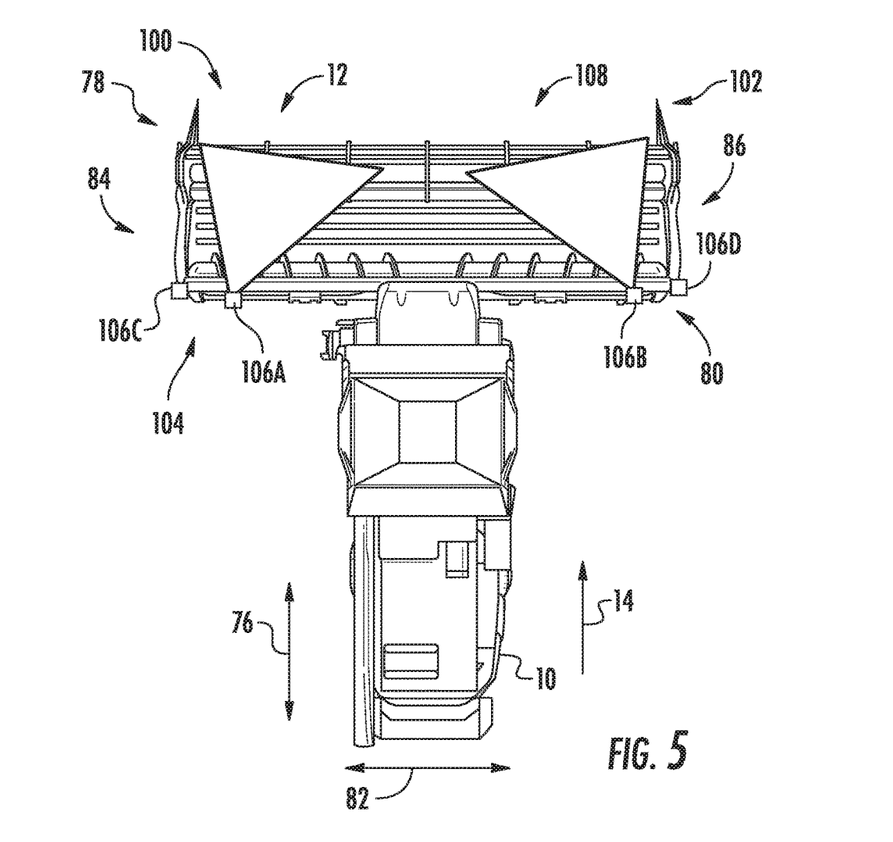
FIG. 5 illustrates another top view of the illumination system of FIG. 3 in accordance with aspects of the present subject matter. particularly illustrating an illumination array in a first pre-set illumination pattern corresponding to a harvesting state.

Referring now to the embodiments illustrated in FIGS. 1 and 5, in certain embodiments, the first operating state may correspond to a harvesting state in which the header 12 is adjusted to the lowered position and the header auger 56 is actuated and/or powered. Moreover, in such an operating state, one or more of the lighting devices 106 is powered to illuminate the area of crop engagement 108. As particularly shown in FIG. 5, an embodiment of the illumination system 102 is illustrated in accordance with aspects of the present subject matter. Particularly, FIG. 5 illustrates the illumination array 104 in a first pre-set illumination pattern corresponding to the harvesting state. As such, one or more of the lighting devices 106 may be powered to illuminate the area of crop engagement 108. For instance, in the exemplary embodiment shown, in the first pre-set illumination pattern the first and second lighting devices 106A, 106B may be powered to illuminate the area of crop engagement 108.

Referring now the embodiments of FIGS. 1 and 3, in certain embodiments, the second operating state may correspond to a transportation state in which the header 12 is adjusted to the raised position and the header auger 56 is deactivated and/or powered off. Moreover, in a second pre-set illumination pattern corresponding to the transportation state, one or more of the lighting devices 106 may be powered to illuminate the path of the harvesting implement. In one exemplary embodiment, one or both of the third or fourth lighting devices 106C, 106D may be powered to illuminate the path of the header 12. Furthermore, it should be appreciated that lighting devices 106 oriented to illuminate the area of crop engagement 108 (e.g., the first and second lighting devices 106A, 106B) may be depowered during the transportation state or may remain illuminated. In an additional or alternative embodiment, the second operating state may be a turning state. Further, in a second pre-set illumination pattern corresponding to the turning state, one or more of the lighting devices 106 may be powered to illuminate the path of the header 12 on a side 84, 86 of the header 12 oriented in the direction of the turning state.

Figure 6:
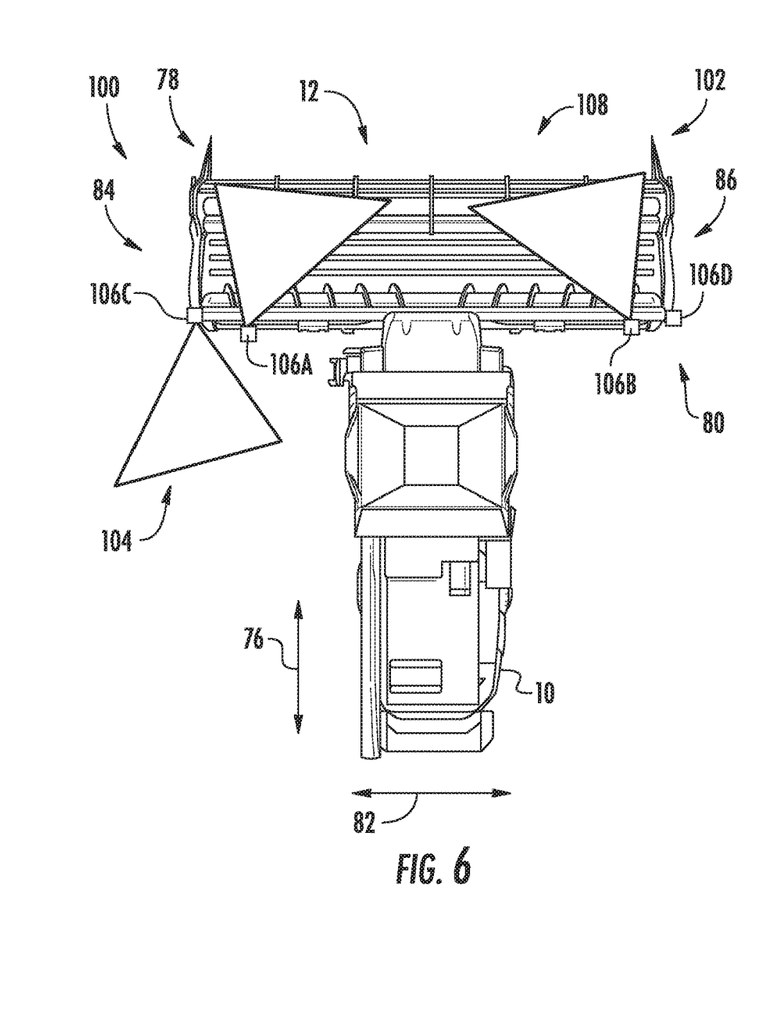
FIG. 6 illustrates another top view of the illumination system of FIG. 3 in accordance with aspects of the present subject matter, particularly illustrating an illumination array in a second pre-set illumination pattern corresponding to a turning state toward a first side of the harvesting implement.
Figure 7:
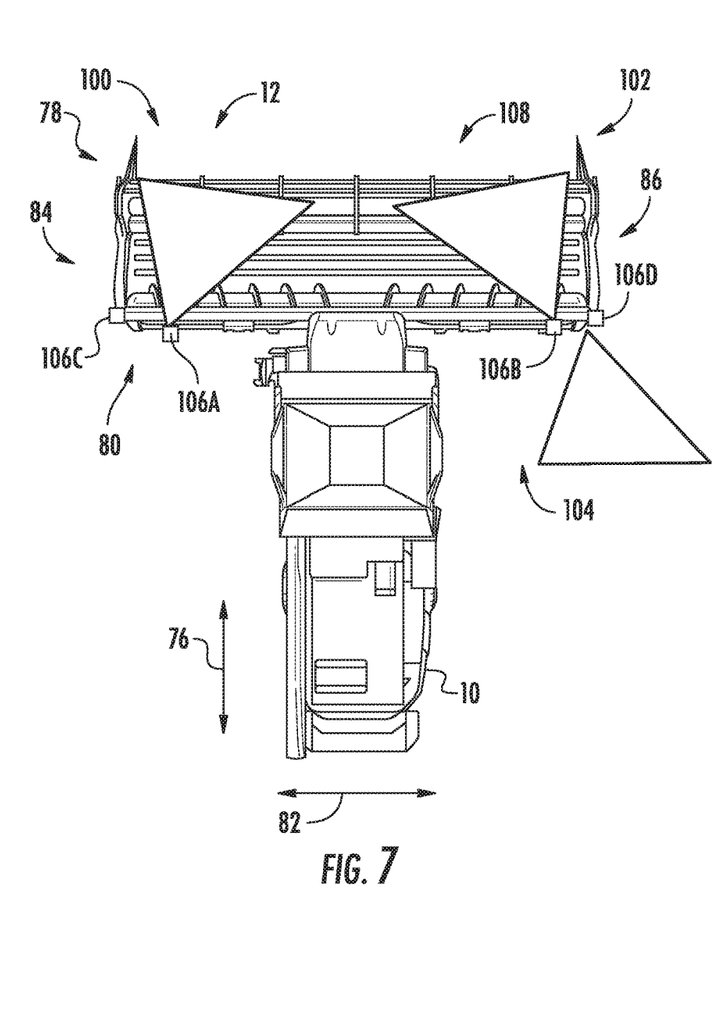
FIG. 7 illustrates another top view of the illumination system of FIG. 3 in accordance with aspects of the present subject matter, particularly illustrating the illumination array in a second pre-set illumination pattern corresponding to a turning state toward a second side of the harvesting implement.

Referring now to FIGS. 6 and 7, an embodiment of the harvesting system 100 is illustrated in accordance to aspects of the present subject matter. FIG. 6 particularly illustrates the illumination system 102 configured for a turning state oriented toward the first side 84 of the header 12. In a second pre-set illumination pattern corresponding to the turning state oriented toward the first side 84, one or more lighting devices 106 may be powered to illuminate the path of the header 12 at the first side 84 of the header 12. For instance, as illustrated, the third lighting device 106C may be powered to illuminate the path of the header 12 at the first side 84. FIG. 7 particularly illustrates the illumination system 102 configured for a turning state oriented toward the second side 86 of the header 12. In a second pre-set illumination pattern corresponding to the turning state oriented toward the second side 86, one or more lighting devices 106 may be powered to illuminate the path of the header 12 at the second side 86 of the header 12. For instance, as illustrated, the fourth lighting device 106D may be powered to illuminate the path of the header 12 at the second side 86. In the second pre-set illumination patterns of FIGS. 6 and 7, the lighting devices 106 oriented to illuminate the area of crop engagement 108 (e.g., the first and second lighting devices 106A, 106B) are powered on. However, it should be appreciated that in other configuration of the second pre-set illumination pattern corresponding to a turning state one or more, such as all, of such lighting devices 106 configured to illuminate the area of crop engagement 108 may be depowered.

Figure 8:
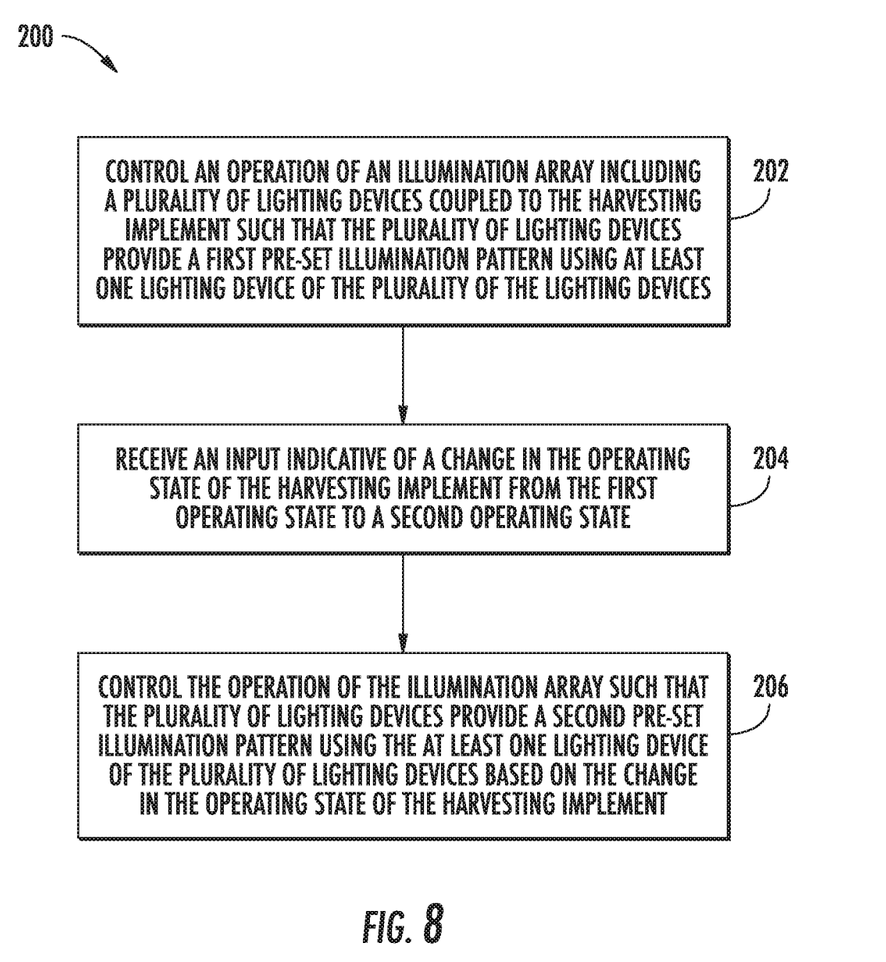
FIG. 8 illustrates a flow diagram of one embodiment of a method for automatically adjusting an illumination pattern for a harvesting implement in accordance with aspects of the present subject matter.

Referring now to FIG. 8, a flow diagram of one embodiment of a method 200 for automatically adjusting an illumination pattern for a harvesting implement associated with an agricultural harvester is illustrated in accordance with aspects of the present subject matter. In general, the method 200 will be described herein with reference to the harvesting system 100 and illumination system 102 shown in FIGS. 1 through 7. However, it should be appreciated that the disclosed method 200 may be implemented with harvesters and harvesting implements having any other suitable configurations, lighting devices having any other suitable lighting arrangement, and/or within systems having any other suitable system configuration. In addition. although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include controlling an operation of an illumination array including two or more lighting devices coupled to the harvesting implement. For example, as indicated above, the controller 110 coupled to the header 12 may be configured to control the operation of the illumination array 104 and/or the constituent lighting devices 106 of the illumination array 104 (such as selectively supplying power to the lighting devices 106A, 106B, 106C, 106D) coupled to the header 12 based on the operating state of the harvesting system 100. In such an embodiment, a first pre-set illumination pattern corresponding to a first operating state of the harvesting system 100 may be stored in the memory 114 of the controller 110.

Additionally, at (204), the method 200 may include receiving an input indicative of a change in the operating state of the harvesting implement from the first operating state to a second operating state. Specifically, as indicated above, the controller 110 may be configured to receive an input from the harvester controller 1 that indicates the header 12 has undergone a change in operating states. For instance, the change in operating states may include a change from a harvesting state to a transportation state and/or a turning state.

Moreover, at (206), the method 200 may include controlling the operation of the illumination array such that the lighting devices provide a second pre-set illumination pattern using one or more of the lighting devices based on the change in the operating state of the harvesting implement. For instance, as indicated above, when it is determined that the operating state of the header 12 has changed, the controller 110 may be configured to control the operation of the lighting devices 106 of the illumination array 104 to adjust the illumination pattern of the header 12 and/or the path of the header 12 based on the new operating state. For instance, the controller 110 may determine which light setting should be applied based on the current operating state of the header 12. Thereafter, the controller 110 may, for example, selectively supply power to one or more of the lighting devices 106 to match the second pre-set illumination pattern corresponding to the second operating state stored within the memory 114 of the controller 110.

In one embodiment, the method 200 may further include receiving a second input indicative of a change in the operating state of the harvesting implement from the second state to a third state. For instance, the controller 110 to receive an input from the harvester controller 11 that indicates the header 12 has undergone a change in operating states. For instance, the change in operating states may include a change from the transportation state and/or a turning state to the harvesting state. In one particular embodiment, the first operating state may be a harvesting state, the second operating state may be a transportation state and/or turning state, and the third operating state may be the harvesting state. The method 200 may include controlling the operation of the illumination array 104 such that the lighting devices 106 provide a third pre-set illumination pattern using one or more of the lighting devices 106 based on the change in the operating state of the harvesting implement. In certain embodiments, the third operating state may be the same as the first operating state, and the third pre-set illumination pattern may be the same as the first pre-set illumination pattern. For instance, the change to the third operating state may correspond to a return to a harvesting state (e.g., the first operating state) such that the controller 110 selectively supplies power to the lighting devices 106 configured to illuminate the area of crop engagement 108, which may be the same pre-set illumination pattern as the first pre-set illumination pattern.

It is to be understood that the steps of the method 200 are performed by the controller 110 upon loading and executing software code or instructions which are tangibly stored on a tangible computer readable medium, such as on a magnetic medium, e.g., a computer hard drive, an optical medium, e.g., an optical disc, solid-state memory. e.g., flash memory, or other storage media known in the art. Thus, any of the functionality performed by the controller 110 described herein, such as the method 200, is implemented in software code or instructions which are tangibly stored on a tangible computer readable medium. The controller 110 loads the software code or instructions via a direct interface with the computer readable medium or via a wired and/or wireless network. Upon loading and executing such software code or instructions by the controller 110, the controller 110 may perform any of the functionality of the controller 110 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An illumination system for the operation of an agricultural harvester, the system comprising:
   a header configured for coupling to and decoupling from an agricultural harvester and for severing crops from a ground;
   an illumination array including a plurality of lighting devices, each lighting device of the plurality of lighting devices disposed on the header and configured to illuminate at least one of an area of crop engagement or a path of the header;
   a controller coupled to the header, the controller communicatively coupled to each lighting device of the plurality of lighting devices, the controller configured to:
   control an operation of the illumination array such that the lighting devices provide a first pre-set illumination pattern using at least one lighting device of the plurality of the lighting devices based on a first operating state of the header;
   receive, from a harvester controller, an input indicative of a change in an operating state of the header from the first operating state to a second operating state; and
   in response to receipt of the input, control the operation of the illumination array such that the lighting devices provide a second pre-set illumination pattern using the at least one lighting device of the plurality of lighting devices based on the change in the operating state of the header,
   wherein the first operating state corresponds to a harvesting state and the second operating state corresponds to a transportation state, and
   wherein the first pre-set illumination pattern differs from the second pre-set illumination pattern.

2. The illumination system of claim 1, wherein in the first pre-set illumination pattern the at least one lighting device of the plurality of lighting devices is powered to illuminate the area of crop engagement.

3. The illumination system of claim 1, wherein in the second pre-set illumination pattern the at least one lighting device of the plurality of lighting devices is powered to illuminate the path of the header.

4. The illumination system of claim 1, wherein the second operating state corresponds to a turning state, and wherein in the second pre-set illumination pattern the at least one lighting device of the plurality of lighting devices is powered to illuminate the path of the header on a side of the header oriented in the direction of the turning state.

5. The illumination system of claim 1, wherein the plurality of lighting devices includes at least four lighting devices, a first lighting device and second lighting device each coupled to a frame of the header and each configured to illuminate the area of crop engagement, a third lighting device coupled to a first side of the frame and configured to illuminate the path of the header at the first side of frame, and a fourth lighting device coupled to a second side of the frame and configured to illuminate the path of the header at the second side of the frame.

6. The illumination system of claim 5, wherein the first operating state corresponds to a harvesting state, and wherein in the first pre-set illumination pattern the first and second lighting devices are powered to illuminate the area of crop engagement.

7. The illumination system of claim 5, wherein the second operating state corresponds to a turning state oriented toward the first side of the frame, and wherein in the second pre-set illumination pattern the third lighting device is powered to illuminate the path of the header at the first side of the frame.

8. The illumination system of claim 5, wherein the second operating state corresponds to a turning state oriented toward the second side of the frame, and wherein in second pre-set illumination pattern the fourth lighting device is powered to illuminate the path of the header at the second side of the frame.

9. The illumination system of claim 1, wherein the controller is configured to receive the input indicative of the change in the operating state of the header from the harvester controller provided in operative association with the agricultural harvester.

10. The illumination system of claim 1, wherein the controller is further configured to:
in response to the receipt of the input, control an operative condition of the header based on the change in the operating state.

11. A method for automatically adjusting an illumination pattern for a header configured for coupling to and decoupling from an agricultural harvester, the method comprising:
controlling, with a computing device coupled to the header, an operation of an illumination array including a plurality of lighting devices disposed on the header such that the plurality of lighting devices provide a first pre-set illumination pattern using at least one lighting device of the plurality of the lighting devices, the first pre-set illumination pattern associated with a first operating state of the header;
receiving, from a harvester controller with the computer device, an input indicative of a change in an operating state of the header from the first operating state to a second operating state; and
in response to receipt of the input, controlling, with the computing device, the operation of the illumination array such that the plurality of lighting devices provide a second pre-set illumination pattern using the at least one lighting device of the plurality of lighting devices based on the change in the operating state of the header,
wherein the first operating state corresponds to a harvesting state and the second operating state corresponds to a transportation state, and
wherein the first pre-set illumination pattern differs from the second pre-set illumination pattern.

12. The method of claim 11, wherein the change in the operating state of the header from the first operating state to the second operating state is associated with a change from a harvesting state to a turning state, wherein in the first pre-set illumination pattern the at least one lighting device of the plurality of lighting devices is powered to illuminate the area of crop engagement, and wherein in the second pre-set illumination pattern the at least one lighting device of the plurality of lighting devices is powered to illuminate the path of the header on a side of the harvesting implement oriented in the direction of the turning state.

13. The method of claim 12, wherein the plurality of lighting devices includes at least four lighting devices, a first lighting device and second lighting device each coupled to a frame of the header and each configured to illuminate the area of crop engagement, a third lighting device coupled to a first side of the frame and configured to illuminate the path of the header at the first side of frame, and a fourth lighting device coupled to a second side of the frame and configured to illuminate the path of the header at the second side of the frame,
and wherein in the first pre-set illumination pattern the first and second lighting devices are powered to illuminate the area of crop engagement.

14. The method of claim 13, wherein the turning state is oriented toward the first side of the frame, and wherein in the second pre-set illumination pattern the third lighting device is powered to illuminate the path of the header at the first side of the frame.

15. The method of claim 13, wherein the turning state is oriented toward the second side of the frame, and wherein in the second pre-set illumination pattern the fourth lighting device is powered to illuminate the path of the header at the second side of the frame.

16. The method of claim 12, further comprising:
receiving, with the computing device, a second input indicative of a change in the operating state of the header from the turning state to the harvesting state; and
in response to receipt of the second input, controlling, with the computing device, the operation of the illumination array such that the at least one lighting device of the plurality of lighting devices is powered to provide the first pre-set illumination pattern configured to illuminate the area of crop engagement.

17. The method of claim 11, the method further comprising:
in response to the receipt of the input, controlling, with the computing device, an operative condition of the header based on the change in the operating state.

18. The method of claim 17, wherein the change in the operating state of the header from the first operating state to the second operating state is associated with a change from a harvesting state to a turning state, and wherein controlling the operative condition of the header comprises raising the header from a harvesting position to a raised position.

19. The method of claim 17, wherein the change in the operating state of the header from the first operating state to the second operating state is associated with a change from a turning state to a harvesting state, and wherein controlling the operative condition of the header comprises lowering the header from a raised position to a harvesting position.

20. A harvesting system, the harvesting system comprising:
- a harvester configured to move across a field;
- a harvester controller coupled to the harvester and configured to control an operation of the harvester;
- a header coupled to the agricultural harvester, the header configured being able to decouple from the agricultural harvester;
- an illumination system for the operation of the header; the illumination system comprising:
- an illumination array including a plurality of lighting devices, each lighting device of the plurality of lighting devices disposed on the header and configured to illuminate at least one of an area of crop engagement or a path of the header;
- a controller coupled to the header, the controller communicatively coupled to the harvesting controller, the controller further communicatively coupled to each lighting device of the plurality of lighting devices, the controller configured to:
  - control an operation of the illumination array such that the lighting devices provide a first pre-set illumination pattern using at least one lighting device of the plurality of the lighting devices based on a first operating state of the header;
  - receive an input communicated from the harvester controller indicative of a change in an operating state of the header from the first operating state to a second operating state; and
  - in response to receipt of the input, control the operation of the illumination array such that the lighting devices provide a second pre-set illumination pattern using the at least one lighting device of the plurality of lighting devices based on the change in the operating state of the header,
- wherein the first operating state corresponds to a harvesting state and the second operating state corresponds to a transportation state, and
- wherein the first pre-set illumination pattern differs from the second pre-set illumination pattern.

* * * * *